July 17, 1934.   T. MUNGEN   1,967,060
STEEL CORE FOR STEERING WHEELS AND THE LIKE
Filed July 2, 1930

INVENTOR.
THEODORE MUNGEN
BY
ATTORNEY.

Patented July 17, 1934

1,967,060

UNITED STATES PATENT OFFICE 1,967,060

STEEL CORE FOR STEERING WHEELS AND THE LIKE

Theodore Mungen, Philadelphia, Pa., assignor to Edward G. Budd Manufacturing Co., Philadelphia, Pa., a corporation of Pennsylvania Application July 2, 1930, Serial No. 465,333

4 Claims. (Cl. 74—552)

This invention relates to ring-shaped, curled sheet metal articles adapted for use as cores for steering wheels formed of vulcanized rubber or for similar articles, or adapted for use in connection with the manufacture of other articles.

The invention is purported to be an adaptation of the method and apparatus disclosed in my copending application bearing Serial Number 464,786, filed June 30, 1930, for an Apparatus and method for forming outside curls.

The principal object of the invention is to provide a core that is adapted for use as a reinforcing member in compressed vulcanized articles and one which will not permit seeping of the material under high compression in the molds into the interior of same.

A no less important object of the invention is the provision of such a core that will, in addition, prevent creeping of the vulcanizing material from one region of the mold to another region to deprive the first region of sufficient material to properly form the mold.

Yet another object of the invention is to provide a core which may be made from strip stock or scrap material at a minimum cost thereby resulting in economy in the present and in another manufacture.

A further object of the invention is to provide a core or like article which is formed by the curling process disclosed in the above-mentioned application, and which is extremely strong in its construction, and which may be manufactured from one or more strips of sheet material without the necessity of bringing the ends of these sheets together and welding the same to form the closed ring-shaped structure.

A number of exacting tests of steering wheel cores manufactured in accordance with the principles of the present invention have demonstrated that the type of core disclosed in this application maintains the curl formed intact under conditions that will produce damage and leakage in similar reinforcing rings or cores manufactured by other well known processes. The material of this present core when subjected to excessive stress becomes deformed and bends together as a unit instead of separating under such stress as usually occurs with articles manufactured by older methods. This latter feature is caused by the fact that the successive laps of the curl are caused to bear against each other with such great force that any subsequent deformation of the ring will fail to buckle the layer.

With these and many other objects in view which will more readily become apparent as the nature of the invention is better understood, the same consists in the novel construction, combination, and arrangement of parts shown in the accompanying single sheet of drawings, in which:—

In the above three views, like characters of reference are employed to designate like parts throughout.

Figure 1:
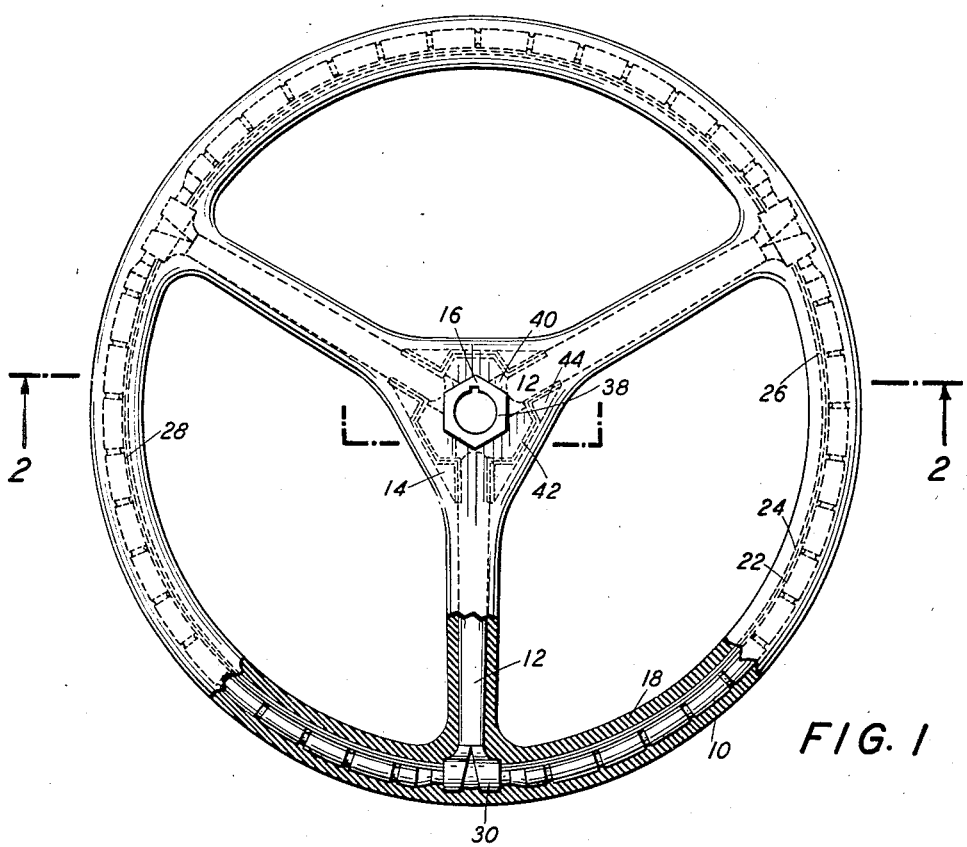
Fig. 1 is a front elevation partly in section showing a steering wheel manufactured in accordance with the present invention.
Figure 2:
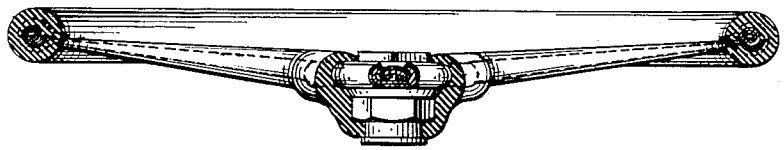
Fig. 2 is a sectional view taken substantially along the line 2—2 of Fig. 1.
Figure 3:
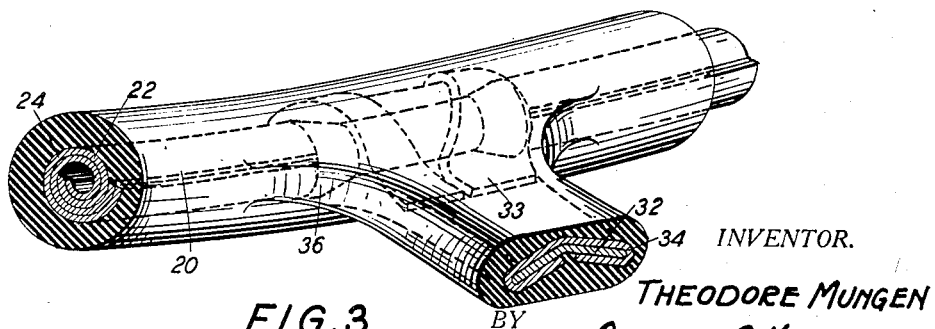
Fig. 3 is a fragmental perspective view showing the method of joinder between steering wheel rim and one of the steering wheel spokes.

The steering wheel generally comprises a ring-shaped core 10 formed of sheet material. This core has connected thereto at suitably spaced points, a spider having spokes 12 extending radially outwardly from a central hub portion 14 carrying an attaching collar 16. The spider also forms a part of the core of the steering wheel and is formed of laminated sheet material as will be described hereinafter. The ring-shaped core 10 and the spider core 12—14 are adapted to be embedded in a suitable finishing material formed preferably of vulcanized rubber and shown at 18.

The above-mentioned parts broadly described are not novel as steering wheels have been formed with spider and ring cores. The novelty in the present application resides specifically in the particular formation of the ring-shaped core and in the formation of the spider and its relation to the central attaching collar. The ring-shaped core 10 is manufactured by the method and apparatus set forth in the above-mentioned copending application and comprises a pair of strips of sheet material 22—24, in the form of a complete ring-shaped curl having a seam 20 terminating on the inside thereof, the adjacent ends of each sheet of material are free with respect to each other on the circumference of the ring. The adjacent ends of the strip 22 is shown at 26 and the adjacent ends of the strips 24 are shown at 28. While these points might be suitably spaced apart at any distance desired, they are preferably diametrically opposed, and thus the medial portion of each sheet of material serves to bind the adjacent ends of the other sheet of material against separation and thus the necessity for butt welding the adjacent ends of the sheets in order to maintain a closed structure is eliminated.

The ring-shaped core 10 is provided with equally spaced points 30 with reduced portions, to which reduced portions are secured the ends of the spider. Each spoke 12 of the spider consists in a central layer of material 32, bowed in cross section, and an outer layer 34 substantially surrounding the same. The outer ends of the layers are flattened as at 36 and are bent around the reduced portions of the core 10 to firmly secure the spokes in position at the circumference of the wheel. The width of the layers 32 and 34 at their flattened portions is equal to the width of the reduced portions to prevent side play of the spokes.

The attaching collar 16 is provided with a groove 38 and the inner ends of the layers 32 and 34 are flattened as at 40 and extend into the groove 38 where they are clamped by means of a hub 42, formed of a plurality of superimposed strips, having their edges over-turned as at 44, and engaging the spoke 12. Thus the inner ends of the spokes are firmly held in position within the grooves.

As clearly shown in Fig. 1 the rim is formed with a plurality of grooves, formed in the curled material, and providing substantially circular grooves on the surface of the rim. These grooves are spaced apart a slight distance and are formed by placing protuberances in the dies prior to the curling operation.

These grooves serve to bind the metal of the two layers together and also serve to bind one layer of the curl against the adjacent layer so that when the plastic material is being applied under heat and pressure in the mold, there will be no tendency for the material to seep into the interior of the core. In order to further prevent seeping of the material into the interior of the core and particularly in order to prevent drifting of the material in the mold along the surface of the core from one region to another, the outer surface of the core is roughened by a series of striations formed by roughening the interior of the dies prior to the curling operation.

The invention is not to be limited to the exact arrangement of parts shown in the accompanying sheet of drawings, or described in this specification as many changes are contemplated in the construction of the device. Only insofar as the invention has been particularly pointed out in the accompanying claims is the same to be limited.

What I claim is:

1. In a steering wheel bore, a closed sheet metal rim formed of two or more layers of sheet material, the adjacent ends of each layer occupying positions at points spaced around the circumference of the rim.

2. In a steering wheel core, a closed sheet metal rim formed of two or more layers of sheet material, the adjacent ends of each layer occupying positions at points spaced around the circumference of the rim, said layers being curled in the form of a spiral, and depressions formed in said rim at spaced points, said depressions serving to lock the curled layers together.

3. As an article of manufacture, a closed sheet metal ring formed of two or more curled layers of sheet material, with the adjacent ends of each layer overlapping the other circumferentially of the ring and occupying positions at points spaced around the circumference of the ring.

4. As an article of manufacture, a closed sheet metal ring formed of two or more layers of sheet material, adjacent ends of each layer overlapping the other circumferentially of the ring and occupying positions at points spaced around the circumference of the ring, the layers being curled in the form of a spiral and being formed at spaced points with depressions locking the layers together in their overlapped portions.

THEODORE MUNGEN.